F. HAMACHEK.
BEARING.
APPLICATION FILED JUNE 6, 1918.

1,298,697.

Patented Apr. 1, 1919.

WITNESSES.
C. L. Wasl
H. W. Chase

INVENTOR.
Frank Hamachek
By R. S. C. Caldwell.
ATTORNEY.

UNITED STATES PATENT OFFICE.

FRANK HAMACHEK, OF KEWAUNEE, WISCONSIN.

BEARING.

1,298,697.   Specification of Letters Patent.   Patented Apr. 1, 1919.

Application filed June 6, 1918. Serial No. 238,585.

*To all whom it may concern:*

Be it known that I, FRANK HAMACHEK, a citizen of the United States, and resident of Kewaunee, Kewaunee county, Wisconsin, have invented new and useful Improvements in Bearings, of which the following is a description, reference being had to the accompanying drawings, which are a part of this specification.

This invention relates to bearings, particularly the bearings for supporting-rollers of screen drums of green pea vine hullers.

This case constitutes a continuation in part of my co-pending application for pea hullers, Serial No. 856,523, filed August 13, 1914.

This invention has for its object to provide a bearing for the supporting-roller of a pea separating drum or the like which may be readily relieved of the gummy substance which forms therein by the action of the juice from the pea vines and grit from the wear of the bearings and deposits from the lubricant.

Another object for the invention is to provide a self-cleaning bearing of a construction which will permit of its being readily taken apart when necessary for cleaning or repair.

With the above and other objects in view the invention consists in the bearing as herein claimed and all equivalents.

Figure 1:
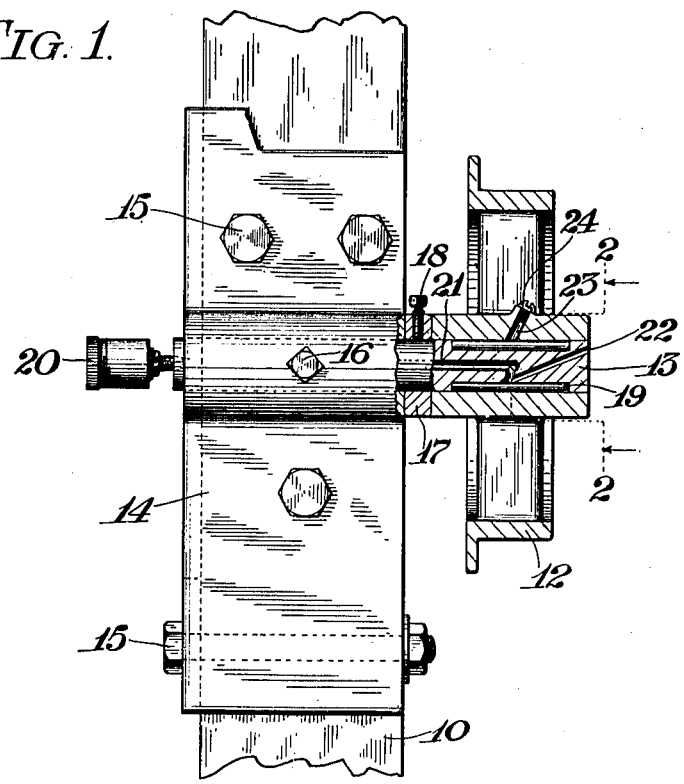
Figure 2:
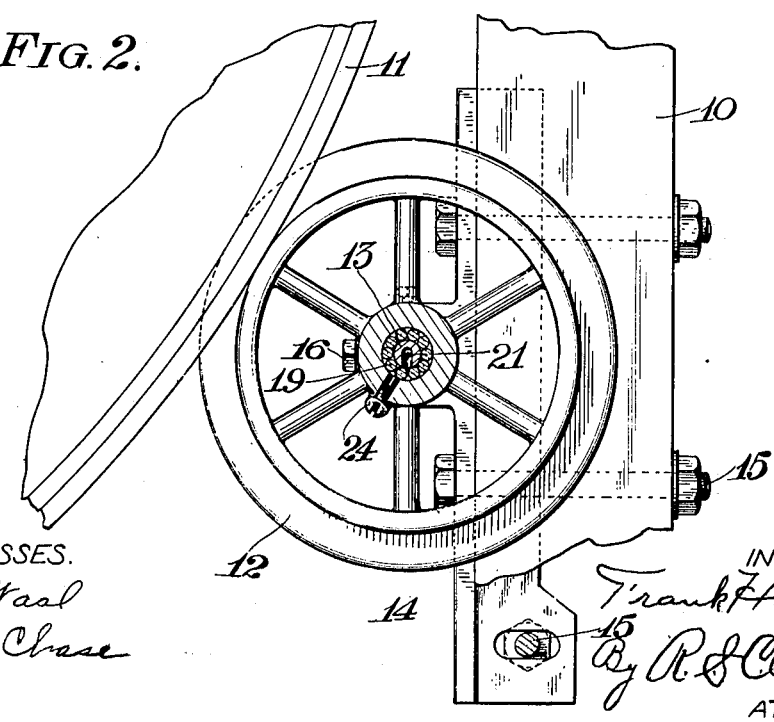

Referring to the accompanying drawings in which like characters of reference indicate the same parts in different views:

Figure 1 is a sectional view of a supporting-roller for a screen drum provided with the bearing of this invention; and, Fig. 2 is a sectional view thereof on the plane of line 2—2 of Fig. 1.

In these drawings 10 indicates an upright or standard forming a part of the frame of the machine, and 11 indicates the cylindrical screen drum which is mounted on flanged rollers 12 so as to be rotatable. Each roller 12 is mounted on a pin 13 which removably fits within a bore through an angular bracket member 14 adjustably clamped on the standard 10. The bracket is made angular so as to fit against two of the adjacent faces of the standard to which it is clamped by bolts 15 in such a manner as to be adjustable to position the roller 12 nearer to or farther from a companion roller on the opposite side of the frame, not shown.

The pin 13 is removably fitted within the bore of the bracket where it is held by a set screw 16, and a collar 17 is fixed on the pin by means of a set screw 18 and is positioned between the hub of the roller 12 and the bracket 14.

The roller hub is cylindrical with its bore of such diameter as to form a working fit around the pin. That portion of the pin which lies within the hub of the roller is reduced in diameter to form a raceway for cylindrical rollers 19 forming a roller bearing between the roller 12 and the pin.

A grease cup 20 may be provided for lubricating the bearing and it is threaded in the end of the pin 13 and communicates with the bearing through a central passageway 21 which terminates in a radial opening at the center of the reduced portion of the pin. A downwardly extending inclined passageway 22 leads from the other end of the pin to the race-way for the rollers 19 and preferably unites with the end of the radial opening of the passageway 21. This passageway 22 is straight so that a straight tool may be inserted therethrough to clean the opening of any obstruction forming therein. Another function of this inclined passageway 22 is to conduct to the bearing kerosene or some similar solvent for the wax-like gummy substance which forms therein. An inclined opening 23 is formed through the hub of the roller 12, preferably leading from the center of the bearing, to permit the dissolved gummy substance to work its way out of the bearing by the combined action of gravity and centrifugal force. This opening is preferably closed by means of a screw plug 24 during the normal operation of the machine and the plug is only removed for discharging the material after the solvent has been injected.

In operation the roller 12 performs its usual function of supporting the drum 11 and permitting it to freely rotate thereon. It is kept lubricated in the usual manner by the grease cup 20 but when the juice from the pea vines forms the objectionable wax-like sticky substance in the bearing to interfere with the free movement of the roller, the passageway 22 is first cleaned by the insertion of the tool therein, which at the same time cleans the outlet opening for the lubricant passageway 21, and then kerosene or other solvent is injected into the bearing through the passageway 22 by means of an oil can or oil gun to flood the bearing. The screw plug 24 is removed and the machine is started in motion, causing the rollers 19 to carry the solvent throughout the bearing. The dissolved gummy substance will then work its way out through the opening 23. As the passageway 22 is stationary the introduction of solvent therethrough may continue until the bearing is thoroughly cleaned. When the bearing is cleaned and the solvent is drained therefrom through the opening 23, the plug 24 may be returned and the bearing again filled with lubricant from the grease cup.

With the use of the bearing of this invention it is not necessary to remove the bearing for cleaning each morning before starting the machine in operation and it is not necessary to materially delay the operation of the machine for cleaning the bearing at any time.

Whenever it is desired to remove the bearing the set screws 18 and 16 may be loosened and the pin 13 may be forced through the roller 12 to carry the rollers 19 into the bore of the bracket 14 so as to release the roller 12, and then the pin may be pushed in the opposite direction to bring the rollers within the collar 17, and with the collar in this position to retain the rollers in place the pin may be removed from the bracket. The collar thus forms a retaining ring for the rollers when the bearing is removed. The flange of the roller 12, by engaging the end of the drum, prevents it from working off of the pin during operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means within the scope of my claims.

What I claim as new and desire to secure by Letters Patent is:

1. In a pea separator, a drum-supporting roller comprising a bearing pin having a reduced portion near its end for containing bearing rollers and provided with an inclined passageway leading from its end to the reduced portion, a roller member having a hub fitting on the bearing pin around the roller bearing and having an opening therethrough leading from the roller bearing, and a plug for normally closing said opening.

2. A bearing for drum-supporting rollers, comprising a suitably supported pin, a roller rotatably mounted on the pin, and bearing rollers between the roller and the pin, there being a passageway through the pin through which a solvent may be admitted to the space containing the rollers for cleaning said space and a passageway from the roller for discharging the solvent from said space.

3. A bearing for supporting-rollers of pea separator drums and the like, comprising a suitably supported pin having a reduced portion forming a raceway for bearing rollers, a drum-supporting roller mounted on the pin, bearing rollers within the raceway between the reduced portion of the pin and the hub of the supporting roller, and means for supplying lubricant to the raceway, there being an inclined opening through the end of the pin leading to the raceway through which solvent may be injected and a passageway leading through the supporting roller from the raceway through which the solvent may be ejected.

4. A bearing for supporting-rollers of pea separator drums and the like, comprising a suitably supported pin having a reduced portion forming a raceway, a supporting-roller mounted on the pin around the raceway, bearing rollers within the raceway, and means for supplying lubricant to the raceway through a passageway in the pin opening into the raceway, there being an inclined opening through the end of the pin and adapted to have a solvent injected therethrough into the bearing, and a passageway through the supporting roller through which the solvent may be ejected.

5. A bearing for supporting-rollers of pea separator drums and the like, comprising a bracket member having an opening therethrough, a pin removably fitting in said opening and provided with a reduced portion forming a raceway, a supporting-roller mounted on the pin with its hub surrounding the raceway, bearing rollers in the raceway, and a collar on the pin between the supporting-roller and the bracket adapted to surround the bearing rollers when the pin is withdrawn from the supporting-roller.

6. A bearing for supporting-rollers of pea separator drums and the like, comprising a bracket member having an opening, a pin removably fitting within the opening and provided with a reduced portion forming a race-way, a supporting-roller mounted on the pin with its hub surrounding the raceway, bearing rollers in the raceway, a grease cup threaded in one end of the pin, there being a passageway through the pin leading from the grease cup and terminating in an opening leading to the raceway, an inclined passageway through the other end of the pin communicating with said opening through which a solvent may be injected into the bearing, the hub of said supporting roller being provided with an opening leading from the raceway through which the solvent may be ejected from the bearing, and a screw plug fitting in the last mentioned opening.

In testimony whereof, I affix my signature in presence of two witnesses.

FRANK HAMACHEK.

Witnesses:
   F. HAMACHEK, Jr.,
   OLGA LOUGHRAN.